(12) United States Patent
Gu

(10) Patent No.: US 12,051,228 B2
(45) Date of Patent: Jul. 30, 2024

(54) METHOD AND DEVICE FOR TABLE EXTRACTION, AND TOUCH CONTROL DISPLAY DEVICE

(71) Applicant: BOE Technology Group Co., Ltd., Beijing (CN)

(72) Inventor: Yu Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 419 days.

(21) Appl. No.: 17/424,138

(22) PCT Filed: Jan. 8, 2021

(86) PCT No.: PCT/CN2021/070960
§ 371 (c)(1),
(2) Date: Jul. 19, 2021

(87) PCT Pub. No.: WO2021/143629
PCT Pub. Date: Jul. 22, 2021

(65) Prior Publication Data
US 2023/0162467 A1 May 25, 2023

(30) Foreign Application Priority Data
Jan. 16, 2020 (CN) .......................... 202010049334.3

(51) Int. Cl.
*G06V 10/26* (2022.01)
*G06F 3/04883* (2022.01)
*G06V 30/413* (2022.01)

(52) U.S. Cl.
CPC .......... *G06V 10/26* (2022.01); *G06F 3/04883* (2013.01); *G06V 30/413* (2022.01)

(58) Field of Classification Search
None
See application file for complete search history.

(56) References Cited

U.S. PATENT DOCUMENTS 11,842,044 B2 * 12/2023 Zhu .................. G06F 3/0237
2007/0031007 A1 2/2007 Bitar
(Continued)

FOREIGN PATENT DOCUMENTS

| CN | 101981583 A | 2/2011 |
| CN | 102930268 A | 2/2013 |

(Continued)

OTHER PUBLICATIONS

CN202010049334.3 first office action.

*Primary Examiner* — Nancy Bitar
(74) *Attorney, Agent, or Firm* — IPro, PLLC

(57) ABSTRACT

The present disclosure provides a method for table extraction. The method includes: extracting a screen picture corresponding to a screen content of the touch control display device in response to an operation instruction; detecting the screen picture to obtain a second table corresponding to the first table contained in the screen picture; obtaining text information in the screen picture; and establishing a matching relationship between the second table and the text information to obtain the second table containing a text. When a user needs to save the screen content, the user may trigger extraction of the screen picture. Next, the second table corresponding to the first table in the screen picture and text information in the second table may be automatically extracted, and the second table and the text information are saved as a destination document.

17 Claims, 6 Drawing Sheets

(56) References Cited

U.S. PATENT DOCUMENTS

| | | | |
|---|---|---|---|
| 2007/0140565 A1 | 6/2007 | Lin et al. | |
| 2009/0245645 A1* | 10/2009 | Xing | G06F 40/177 |
| | | | 382/189 |
| 2009/0245654 A1 | 10/2009 | Xing et al. | |
| 2014/0029853 A1 | 1/2014 | Xue | |
| 2017/0004359 A1* | 1/2017 | Venkatachalam | G06T 7/11 |
| 2018/0144314 A1* | 5/2018 | Miller | G06Q 20/14 |
| 2020/0042148 A1* | 2/2020 | Huang | G06F 3/04845 |
| 2021/0200937 A1* | 7/2021 | Wheaton | G06F 40/284 |

FOREIGN PATENT DOCUMENTS

| | | |
|---|---|---|
| CN | 103258201 A | 8/2013 |
| CN | 103577817 A | 2/2014 |
| CN | 105426856 A | 3/2016 |
| CN | 108984091 A | 12/2018 |
| CN | 109948440 A | 6/2019 |
| CN | 110334585 A | 10/2019 |
| CN | 110363095 A | 10/2019 |
| CN | 110502985 A | 11/2019 |
| CN | 110516208 A | 11/2019 |

\* cited by examiner

METHOD AND DEVICE FOR TABLE EXTRACTION, AND TOUCH CONTROL DISPLAY DEVICE

CROSS REFERENCE TO RELEVANT APPLICATIONS

The present disclosure claims priority to Chinese Patent Application No. 202010049334.3, titled "METHOD AND DEVICE FOR TABLE EXTRACTION, AND TOUCH CONTROL DISPLAY DEVICE" and filed to the State Patent Intellectual Property Office on Jan. 16, 2020, the entire contents of which are incorporated herein by reference.

TECHNICAL FIELD

The present disclosure relates to the field of image recognition technologies, and more particularly, to a method and device for table extraction, and a touch control display device.

BACKGROUND

Generally using touchable display screens as carriers, touch control display devices carry out human-computer interactions based on, for example, multi-point infrared and optical touch control modes to perform writing operations and other operations on touch control display screens, which are typically used in conferences, and teaching scenes, etc.

At present, users may draw contents such as tables, Chinese characters, English words and numerics on the touch control display screens. After drawing these contents, the users may save these contents drawn on the screens as pictures by taking a screenshot when desired.

After saving the contents drawn on the screens in the form of pictures, the users can view these pictures after opening them again, but cannot edit these contents drawn previously.

SUMMARY

The present disclosure provides a method and a device for table extraction, and a touch control display device, to solve the problem that after saving contents drawn on existing screens in the form of pictures, users cannot edit these contents again after opening these pictures.

In one aspect, an embodiment of the present disclosure provides a method for table extraction, which is applied to a touch control display device. The method includes:
  extracting a screen picture corresponding to a screen content of the touch control display device in response to an operation instruction, wherein the screen picture includes a first table;
  detecting the screen picture to obtain a second table corresponding to the first table;
  obtaining text information in the screen picture; and
  establishing a matching relationship between the second table and the text information to obtain the second table containing a text.

In an example of the above embodiment, before the step of extracting a screen picture corresponding to a screen content in response to an operation instruction for extracting a screen content, the method also includes:
  receiving the operation instruction;
  wherein the operation instruction includes:
  an operation instruction indicating to take a screenshot of the screen content of the touch control display device; and
  an operation instruction indicating to perform table extraction on the screen picture corresponding to the screen content of the touch control display device.

In an example of the above embodiment, the first table is a table drawn by utilizing a touch control operation of the touch control display device.

In an example of the above embodiment, the step of detecting the screen picture to obtain a second table corresponding to the first table includes:
  recognizing a candidate curve segment corresponding to the first table in the screen picture; and
  processing the candidate curve segment to generate the second table corresponding to the first table.

In an example of the above embodiment, the step of recognizing a candidate curve segment corresponding to the first table in the screen picture includes:
  processing the screen picture to obtain a binarized image;
  sequentially traversing neighborhood pixels of each candidate pixel in the binarized image row by row by utilizing a first mask pattern according to a first preset sequence;
  determining a neighborhood pixel equal to a preset value of the candidate pixel as a similar pixel to obtain a plurality of first candidate curve segments corresponding to the first table, the plurality of first candidate curve segments being arranged along a first direction;
  sequentially traversing neighborhood pixels of each candidate pixel in the binarized image column by column by utilizing a second mask pattern according to a second preset sequence; and
  determining a neighborhood pixel equal to a preset value of the candidate pixel as a similar pixel to obtain a plurality of second candidate curve segments corresponding to the first table, the plurality of second candidate curve segments being arranged along a second direction, wherein the first direction is not parallel to the second direction.

In an example of the above embodiment, the first direction is perpendicular to the second direction.

In an example of the above embodiment, the step of processing the candidate curve segment to generate the second table corresponding to the first table includes:
  fitting each of the first candidate curve segments and each of the second candidate curve segments respectively to obtain a first polyline segment and a second polyline segment;
  merging a plurality of first polyline segments and a plurality of second polyline segments respectively according to a first preset condition to obtain a first table line and a second table line correspondingly; and
  generating the second table corresponding to the first table according to the first table line and the second table line.

In an example of the above embodiment, before the step of fitting each of the first candidate curve segments and each of the second candidate curve segments respectively, the method further includes:
  deleting the first candidate curve segment and the second candidate curve segment whose lengths are less than a first preset length.

In an example of the above embodiment, the step of merging a plurality of first polyline segments and a plurality of second polyline segments respectively according to a first preset condition to obtain a first table line and a second table line includes:

for any two of the first polyline segments, if an endpoint of a first straight line segment in a first candidate polyline segment is within a first preset range where an endpoint of a second straight line segment in a first polyline segment to be merged is located, merging the first candidate polyline segment and the first polyline segment to be merged; and for any two of the second polyline segments, if an endpoint of a first straight line segment in a second candidate polyline segment is within a first preset range where an endpoint of a second straight line segment in a second polyline segment to be merged is located, merging the second candidate polyline segment and the second polyline segment to be merged.

The first preset range is determined based on a first preset angle, a second preset angle, and a second preset length. When a first angle is less than the first preset angle, a second angle is less than the second preset angle, and a first length is less than the second preset length, the endpoint of the first straight line segment is within the first preset range where the endpoint of the second straight line segment is located.

A first line segment is formed between the endpoint of the first straight line segment and the endpoint of the second straight line segment. The first angle is an angle formed between the first line segment and an extension line of the second straight line segment. The second angle is an angle formed between an extension line of the first straight line segment and the extension line of the second straight line segment. The first length is a length of a perpendicular line segment formed from the endpoint of the first straight line segment to the extension line of the second straight line segment.

In an example of the above embodiment, the step of generating the second table corresponding to the first table according to the first table line and the second table line includes:

sorting a plurality of second table lines according to a third preset sequence;

selecting, from the plurality of second table lines according to a sorting result, a second table line meeting a second preset condition as a first borderline;

selecting, from the remaining second table lines, a second table line meeting a third preset condition as a second borderline, and determining the two first table lines as a third borderline and a fourth borderline respectively; and screening the remaining first table lines and the remaining second table lines according to the first borderline, the second borderline, the third borderline and the fourth borderline to obtain a table midline to generate the second table.

In an example of the above embodiment, the second preset condition includes: two first table lines existing within a second preset range where two endpoints of the second table line are located, and a length difference between the two first table lines being less than a third preset length. The third preset condition includes: the two endpoints of the second table line being respectively within a third preset range where first endpoints of the two first table lines are located.

In an example of the above embodiment, the step of screening the remaining first table lines and the remaining second table lines according to the first borderline, the second borderline, the third borderline and the fourth borderline to obtain a table midline includes:

selecting, from the remaining first table lines, a first table line meeting a fourth preset condition as the table midline arranged along the first direction; and selecting, from the remaining second table lines, a second table line meeting a fifth preset condition as the table midline arranged along the second direction.

In an example of the above embodiment, the fourth preset condition includes: distances between the two endpoints of the first table line and the first borderline and the second borderline being less than a first preset distance. The fifth preset condition includes: distances between the two endpoints of the second table line and the third borderline and the fourth borderline being less than a second preset distance.

In an example of the above embodiment, the step of establishing a matching relationship between the second table and the text information includes:

obtaining first location information of each cell in the second table;

obtaining second location information of each of the text information; and establishing the matching relationship between the second table and the text information according to the first location information and the second location information.

In an example of the above embodiment, after the step of establishing a matching relationship between the second table and the text information to obtain the second table containing a text, the method further includes:

saving the second table containing the text into a destination document.

In an example of the above embodiment, after the step of saving the second table containing the text into a destination document, the method further includes:

generating a document title according to saving time of the destination document: or receiving a document title inputted by a user, and adding the document title to the destination document.

In one aspect, an embodiment of the present disclosure also provides a device for table extraction, which is applied to a touch control display device. The device for table extraction includes:

a screen picture obtaining module, configured to extract a screen picture corresponding to a screen content of the touch control display device in response to an operation instruction, wherein the screen picture includes a first table;

a table detection module, configured to detect the screen picture to obtain a second table corresponding to the first table;

a text information recognition module, configured to obtain text information in the screen picture; and a table generation module, configured to establish a matching relationship between the second table and the text information to obtain the second table containing a text.

In an example of the above embodiment, the device further includes:

an operation instruction receiving module, configured to receive an operation instruction.

The operation instruction includes:

an operation instruction indicating to take a screenshot of the screen content of the touch control display device; and an operation instruction indicating to perform table extraction on the screen picture corresponding to the screen content of the touch control display device.

In an example of the above embodiment, the table detection module is configured to:

recognize a candidate curve segment corresponding to the first table in the screen picture; and process the candidate curve segment to generate the second table corresponding to the first table.

In an example of the above embodiment, the operation of recognizing a candidate curve segment corresponding to the first table in the screen picture includes:

performing binarization on the screen picture to obtain a binarized image;

sequentially traversing neighborhood pixels of each candidate pixel in the binarized image row by row by utilizing a first mask pattern according to a first preset sequence;

determining a neighborhood pixel equal to a preset value of the candidate pixel as a similar pixel to obtain a plurality of first candidate curve segments corresponding to the first table, the plurality of first candidate curve segments being arranged along a first direction;

sequentially traversing neighborhood pixels of each candidate pixel in the binarized image column by column by utilizing a second mask pattern according to a second preset sequence; and determining a neighborhood pixel equal to a preset value of the candidate pixel as a similar pixel to obtain a plurality of second candidate curve segments corresponding to the first table, the plurality of second candidate curve segments being arranged along a second direction, wherein the first direction is not parallel to the second direction.

In an example of the above embodiment, the operation of processing the candidate curve segment to generate the second table corresponding to the first table includes:

fitting each of the first candidate curve segments and each of the second candidate curve segments respectively to obtain a first polyline segment and a second polyline segment;

merging a plurality of first polyline segments and a plurality of second polyline segments respectively according to a first preset condition to obtain a first table line and a second table line; and generating the second table corresponding to the first table according to the first table line and the second table line.

In an example of the above embodiment, the table generation module is configured to: obtain first location information of each cell in the second table;

obtain second location information of each of the text information; and establish the matching relationship between the second table and the text information according to the first location information and the second location information.

In an example of the above embodiment, the device further includes:

a saving module, configured to save the second table containing the text into a destination document.

In an example of the above embodiment, the device further includes:

a document title generation module, configured to generate a document title according to saving time of the destination document: or receive a document title inputted by a user, and add the document title to the destination document.

In one aspect, an embodiment of the present disclosure also provides a touch control display device, which includes a processor, a memory, and a computer program stored in the memory and executed by the processor. The computer program is executable by the processor, whereby steps of the foregoing method for table extraction are performed.

In one aspect, an embodiment of the present disclosure also provides a non-transitory computer-readable storage medium, storing a computer program thereon. The computer program is executable by a processor, whereby steps of the foregoing method for table extraction are performed.

In one aspect, an embodiment of the present disclosure also provides a computing apparatus, which includes:

a memory, storing a computer-readable code therein; and one or more processors, the computer-readable code is executable by the one or more processors, whereby the computing apparatus performs the foregoing method for table extraction.

In one aspect, an embodiment of the present disclosure also provides a computer program product, including a computer-readable code. When the computer-readable code runs on a computing apparatus, the computing apparatus is caused to perform the foregoing method for table extraction. The above description is merely an overview of the technical solutions of the present disclosure. In order to more apparently understand the technical means of the present disclosure to implement in accordance with the contents of specification, and to more readily understand above and other objectives, features and advantages of the present disclosure, specific embodiments of the present disclosure are provided hereinafter.

BRIEF DESCRIPTION OF THE DRAWINGS

To describe the technical solutions of the embodiments of the present disclosure or those of the prior art more clearly, the accompanying drawings required for describing the embodiments or the prior art will be briefly introduced below: Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Detailed description of the present disclosure will further be made with reference to drawings and embodiments in order to make the above objectives, features and advantages of the present disclosure more apparent and lucid. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
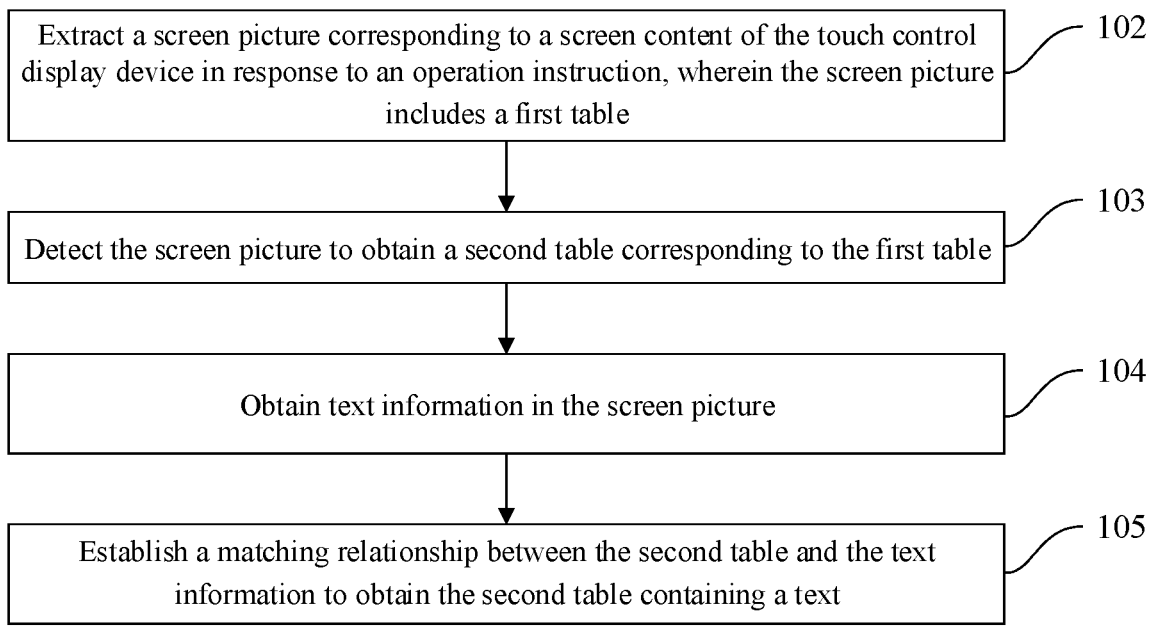
FIG. 1 illustrates a flowchart of a method for table extraction according to an embodiment of the present disclosure.

FIG. 1 illustrates a flowchart of a method for table extraction according to an embodiment of the present disclosure. As shown in FIG. 1, this method for table extraction may be applied to a touch control display device. The method for table extraction in this embodiment may include, for example, following steps.

Step 102: extracting a screen picture corresponding to a screen content of the touch control display device in response to an operation instruction, wherein the screen picture includes a first table.

In some embodiments of the present disclosure, the touch control display device includes a touch control screen and a control module. The control module includes a processor, a memory and other devices. The touch control screen may be an optical touch control screen or an infrared touch control screen, etc.

A user may perform a touch control operation on the screen (i.e., the touch control screen) of the touch control display device. When the touch control operation on the screen is received, a sliding trace corresponding to the user's touch control operation is displayed on the screen. At this moment, information displayed on the screen is drawn by the user on the touch control display device: or, the information displayed on the screen is a content received from other terminals, and the content is also drawn manually.

The above-mentioned screen content may be the content displayed on the screen of the touch control display device. When the user needs to save the information displayed on the screen, the user may trigger the operation instruction. The operation instruction here is an operation instruction indicating to take a screenshot of the screen content of the touch control display device, or an operation instruction indicating to perform table extraction on the screen picture corresponding to the screen content of the touch control display device.

The operation instruction for picture extraction here may be an operation instruction indicating to take a screenshot of the entire screen content, or may be an operation instruction indicating to generate a picture on a part of areas of the screen content. In other words, the operation instruction may be a screen capture instruction or an instruction indicating to capture a part of the screen content, or a part of or all of the screen content corresponding to the screen picture.

Figure 2:
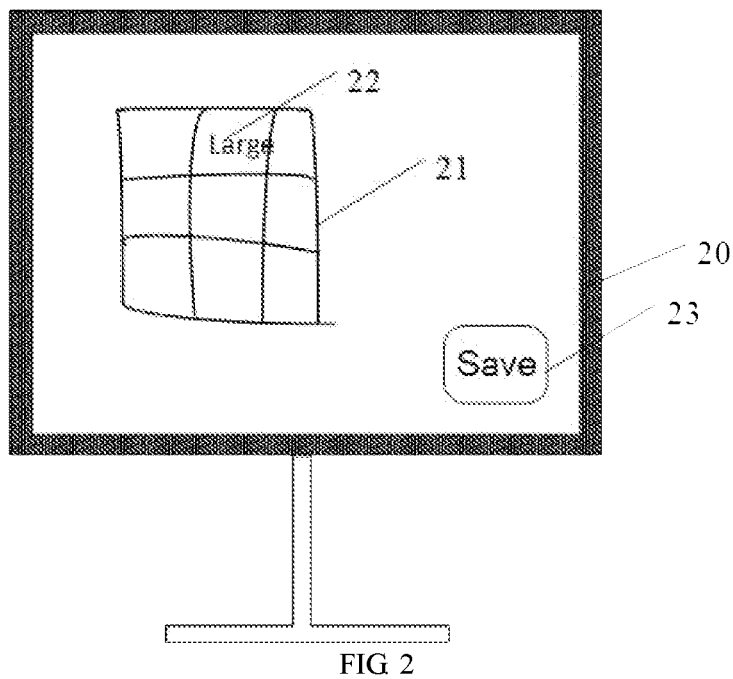
FIG. 2 illustrates a schematic diagram of a touch control display device according to an embodiment of the present disclosure.

FIG. 2 is a schematic diagram of the screen content of the touch control display device in an embodiment. As shown in FIG. 2, the user performs a touch control operation on the screen 20 of the touch control display device. The sliding trace corresponding to the user's touch control operation forms a first table 21 and text information 22 in the first table 21, and the first table 21 and the text information 22 in the first table 21 are displayed on the screen 20. The text information 22 here may be contents determined by writing, such as Chinese characters, English characters, numerics, and special symbols, etc. The text information is with respect to graphic information, and any information that can be recognized as text by a computer is included in the text information described in some embodiments of the present disclosure.

A save control 23 is also provided on the screen 20 of the touch control display device. The save control 23 may be provided at a lower right corner of the screen 20. After the user finishes drawing the first table 21 and the text information 22 in the first table 21 on the screen 20, the user may click the save control 23 if the user needs to save the content drawn on the screen 20, thereby receiving a touch control operation on the save control 23 displayed on the screen 20 of the touch control display device. An operation instruction indicating to take a screenshot of the content displayed on the screen 20 is generated based on the touch control operation on the save control 23, and next the operation instruction is received.

Of course, this operation instruction is not limited to being generated by the touch control operation on the save control 23 displayed on the screen 20. This operation instruction may also be generated by a touch control operation via an Input/Output (I/O) apparatus connected to the touch control display device. The I/O apparatus is a keyboard, a mouse, a remote controller, etc., and the user may generate the operation instruction by operating the I/O apparatus.

In an embodiment of the present disclosure, after the operation instruction is received, the screen picture corresponding to the screen content of the touch control display device is extracted in response to the operation instruction. For example, in examples of some embodiments, the screen picture may be obtained by taking a screenshot of the content displayed on the screen 20 according to the operation instruction.

In some cases, an execution subject such as the touch control display device may take a screenshot of the entire content displayed on the screen 20, rather than just take a screenshot of the content displayed on a specific area of the screen 20. Therefore, the screen picture obtained after the screen capture includes the first table 21 displayed on the screen. Of course, the screen picture also includes the text information 22 in the first table 21.

It is to be noted that the content displayed on the screen 20 may include a plurality of first tables. In this case, the screen picture obtained after the screen capture may include a plurality of first tables, and each of the plurality of first tables includes one or more pieces of text information.

Step 103: detecting the screen picture to obtain a second table corresponding to the first table.

In some embodiments of the present disclosure, after the screen picture is obtained, the screen picture is detected to obtain the second table corresponding to the first table. The second table is different from the first table in that the first table may be a table drawn manually using the touch control operation of the touch control display device, in the first table there may exist a curve segment, and in the second table there may exist a polyline segment obtained after the curve segment is fitted.

When the second table is obtained, table information corresponding to the second table may also be obtained. The table information includes the number of the second tables, the number of rows and columns of each of the second tables, and first location information of each cell included in each of the second tables.

Step 104: obtaining text information in the screen picture.

In some embodiments of the present disclosure, a text information recognition model is obtained by training in advance using deep learning technologies. Specifically, a plurality of pieces of text information is obtained, and the text information is inputted into the initial recognition model to output output text information. Parameters in the initial recognition model are amended according to differences between the output text information and the input text information. In this way, the text information is inputted into the initial recognition model in sequence until the output text information obtained is consistent with the input text information. Finally, the training process is ended, and the text information recognition model is obtained.

Step S105: establishing a matching relationship between the second table and the text information to obtain the second table containing a text.

In this step, the text information in the screen picture is recognized by using the text information recognition model, and each cell in the second table is matched with the text information. That is, each cell in the second table corresponds to the text information, such that the matching relationship between the second table and the text information is established.

In an alternative implementation of this embodiment of the present disclosure, before the Step 102, the method may further include a step as below:

Step 101: receiving an operation instruction.

The operation instruction is an operation instruction indicating to take a screenshot of the screen content of the touch control display device.

As mentioned previously, when the user needs to save the information displayed on the screen, the user may trigger the operation instruction. The operation instruction here is an operation instruction indicating to take a screenshot of the screen content of the touch control display device, or an operation instruction indicating to perform table extraction on the screen picture corresponding to the screen content of the touch control display device.

The operation instruction for picture extraction here may be an operation instruction indicating to take a screenshot of the entire screen content, or may be an operation instruction indicating to generate a picture on a part of areas of the screen content. In other words, the operation instruction may be a screen capture instruction or an operation instruction indicating to capture a part of the screen content, or a part of or all of the screen content corresponding to the screen picture.

In an alternative implementation of this embodiment of the present disclosure, after the Step 105, the method may further include a step as below.

Step 106: saving the second table containing the text into a destination document.

In some embodiments of the present disclosure, after the second table, the text information and the matching relationship between the second table and the text information are obtained, the second table, the text information and the matching relationship are saved to obtain the destination document. Specifically, the second table, the text information and the matching relationship may be saved in the touch control display device, for example, saved in the memory of the touch control display device. Furthermore, the second table, the text information, and the matching relationship may also be sent to cloud or other terminals for storage.

The destination document may be in the format of word and excel, etc. If the second table, the text information and the matching relationship are saved in the touch control display device, the second table, the text information and the matching relationship are saved under a designated directory of the touch control display device. When the user needs to view or edit the content previously drawn on the screen 20 again, the user may find the saved destination document in the designated directory; open the destination document, and edit the destination document again.

It is to be noted that when saving the second table, in fact it is also needed to save table information corresponding to the second table, i.e., the number of the second tables, the number of rows and columns of each of the second tables, and first location information of each cell included in each of the second tables. After the destination document is saved, the user can only see the document saved in the format of word and excel, but cannot directly see the table information corresponding to the second table.

In an alternative implementation of this embodiment of the present disclosure, after the Step 106, the method may further include the following step:

generating a document title according to saving time of the destination document: or receiving a document title inputted by the user, and adding the document title to the destination document.

After the second table, the text information and the matching relationship are saved to obtain the destination document, the document title may be added to the destination document. In the first way, saving time of the destination document is obtained, a document title is generated based on the saving time of the destination document, and then the document title is added to the destination document. For example, if the saving time of the destination document is 18:00 on Dec. 31, 2019, the document title 201912311800 is generated based on the saving time of the destination document, and the document title 201912311800 is added to the destination document. In the second way, after the second table, the text information and the matching relationship are saved to obtain the destination document, an input box is displayed on the screen 20, and the user may enter a document title in the input box. After the document title is received, the document title is added to the destination document. In this case, the document title is a title named by the user according to, for example, the content or usage scenario of the document title.

In some embodiments of the present disclosure, when the user needs to save a screen content displayed on the screen, the user may take a screenshot of the screen content by triggering an operation instruction indicating to take the screenshot of the screen content. Next, the second table corresponding to the first table in the screen picture and text information in the second table may be automatically extracted, and the second table and the text information are saved as the destination document, such that user may edit the screen content again based on the destination document subsequently. In this way, the user's operation experience is improved.

Figure 3:
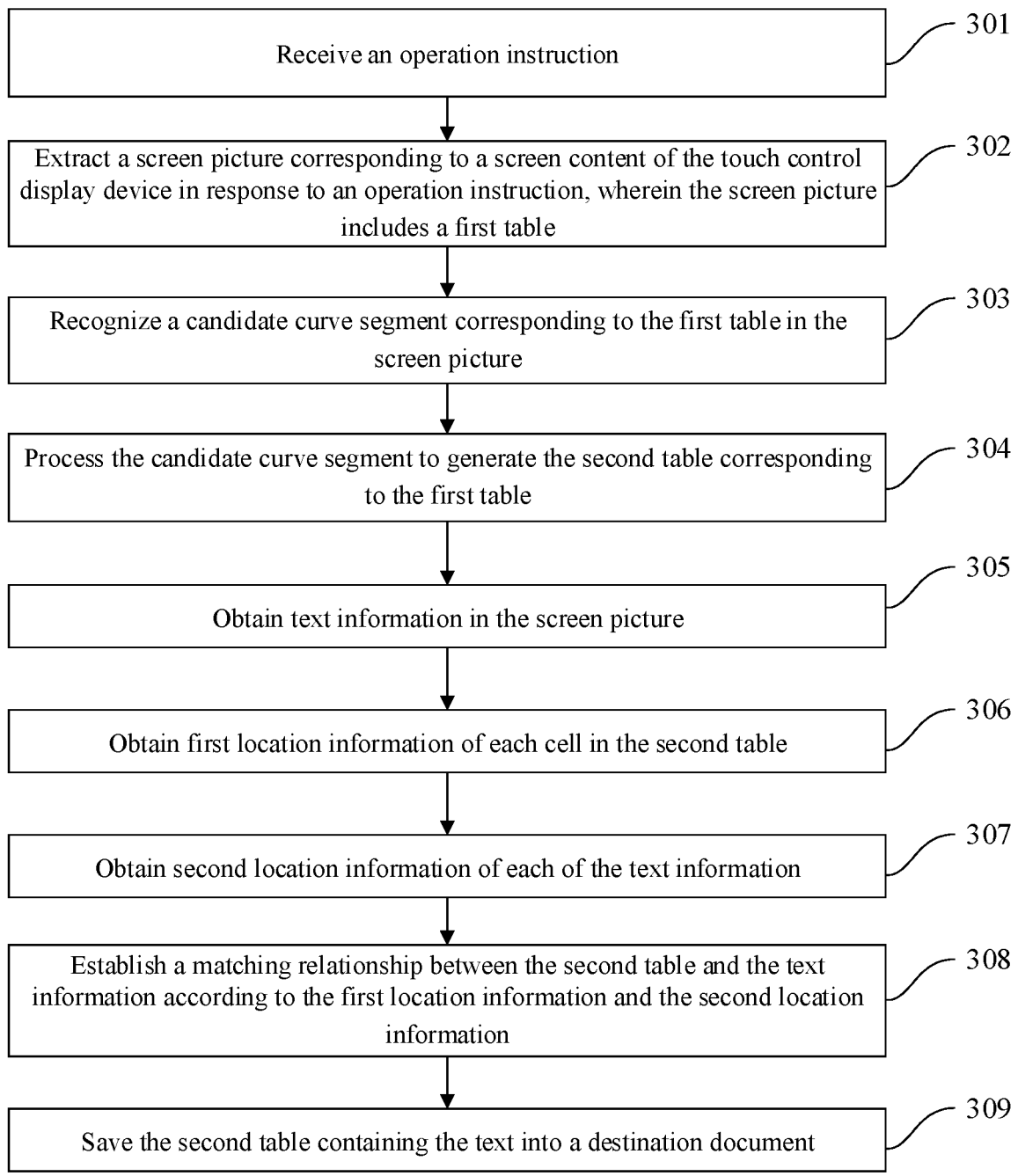
FIG. 3 illustrates a specific flowchart of a method for table extraction according to an embodiment of the present disclosure.

FIG. 3 illustrates a specific flowchart of a method for table extraction according to an embodiment of the present disclosure. As shown in FIG. 3, in one example of this embodiment, the method for table extraction may include following steps.

Step 301: receiving an operation instruction.

This step is similar in principle to the Step 101 in the forgoing embodiment, and thus is not unnecessarily elaborated herein.

Step 302: extracting a screen picture corresponding to a screen content of the touch control display device in response to an operation instruction, wherein the screen picture includes a first table.

This step is similar in principle to the Step 102 in the forgoing embodiment, and thus is not unnecessarily elaborated herein.

Step 303: recognizing a candidate curve segment corresponding to the first table in the screen picture.

In this embodiment of the present disclosure, after the screen picture is obtained, the candidate curve segment corresponding to the first table in the screen picture is recognized. The candidate curve segment includes a first candidate curve segment arranged in a first direction and a second candidate curve segment arranged in a second direction. In some embodiments, the first direction may be a row direction, the second direction may be a column direction, and the first direction and the second direction may be perpendicular to each other. In some other embodiments, the first direction may intersect with but is not perpendicular to the second direction. That is, the first direction and the second direction are not parallel to each other.

Figure 4:
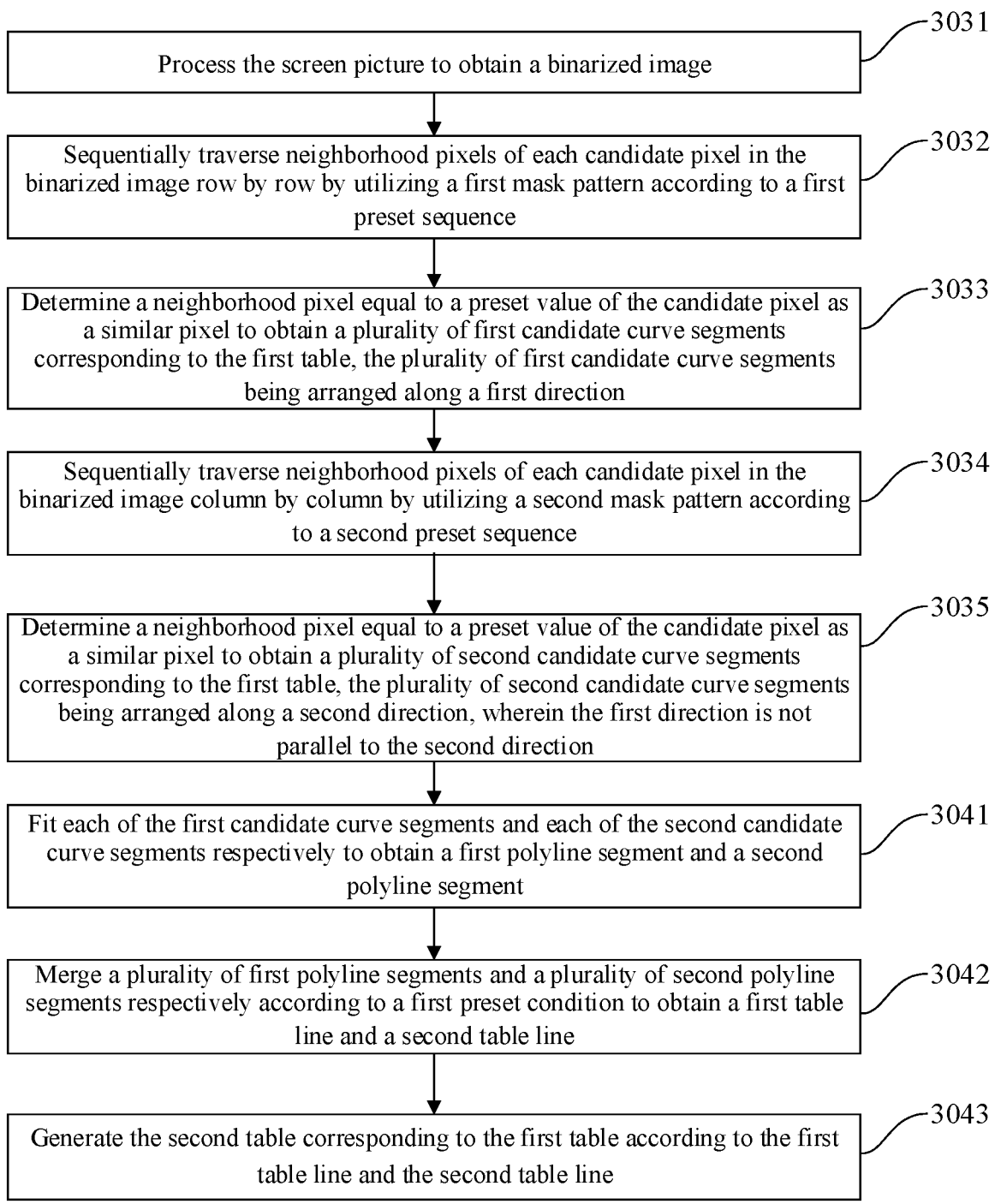
FIG. 4 illustrates a flowchart of a method for generating a second table corresponding to a first table according to an embodiment of the present disclosure.

With reference to FIG. 4, it is illustrated a flowchart of a method for generating the second table corresponding to the first table according to an embodiment of the present disclosure. As shown in FIG. 4, Step 303 may specifically include substeps 3031 to 3035.

Substep 3031: processing the screen picture to obtain a binarized image.

Substep 3032: sequentially traversing neighborhood pixels of each candidate pixel in the binarized image row by row by utilizing a first mask pattern according to a first preset sequence.

Substep 3033: determining a neighborhood pixel equal to a preset value of the candidate pixel as a similar pixel to obtain a plurality of first candidate curve segments corresponding to the first table, the plurality of first candidate curve segments being arranged along a first direction.

Substep 3034: sequentially traversing neighborhood pixels of each candidate pixel in the binarized image column by column by utilizing a second mask pattern according to a second preset sequence.

Substep 3035: determining a neighborhood pixel equal to a preset value of the candidate pixel as a similar pixel to obtain a plurality of second candidate curve segments corresponding to the first table, the plurality of second candidate curve segments being arranged along a second direction, wherein the first direction is not parallel to the second direction.

In a specific example of this embodiment of the present disclosure, the first direction is perpendicular to the second direction.

In a specific embodiment of the present disclosure, after the screen picture is obtained, first, the screen picture is grayed to obtain a grayscale image. When the user draws on the screen 20, traces are left only at locations drawn, no traces are left at locations not drawn, and generally the number of pixels at the locations drawn on the screen 20 is much smaller than that at the locations not drawn. Therefore, gray values of each pixel in the grayscale image are counted to find a maximum value of number of occurrences of a gray value. The gray value corresponding to the maximum value is a gray value of a background pixel (a pixel at the locations not drawn), and the remaining gray values are gray values of foreground pixels (pixels at the locations drawn). A preset value of the background pixel is set to 0, and preset values of the foreground pixels are set to 1. In this way, the binarized image can be obtained.

Figure 5:
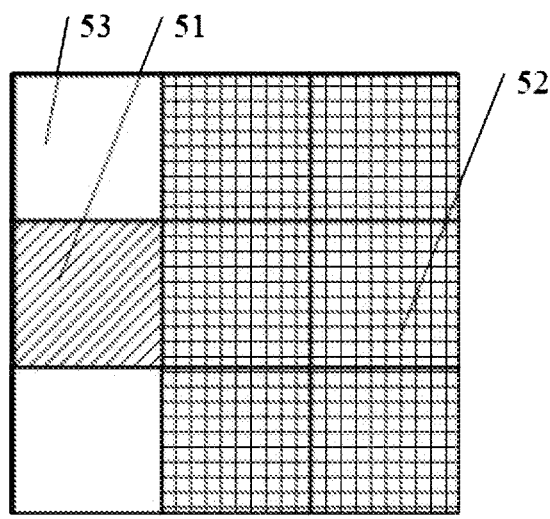
FIG. 5 illustrates a schematic diagram of a first mask pattern according to an embodiment of the present disclosure.

Next, neighborhood pixels of each candidate pixel in the binarized image are sequentially traversed row by row by utilizing a first mask pattern as shown in FIG. 5 according to a first preset sequence. The first preset sequence actually is a sequence from bottom to top and from left to right. A first part 51 in the first mask pattern represents a candidate pixel selected in the process of traversing the binarized image. A second part 52 in the first mask pattern represents the neighborhood pixels of the candidate pixel 51. As shown in FIG. 5, one candidate pixel 51 corresponds to six neighborhood pixels 52. However, pixels corresponding to a third part 53 of the first mask pattern are not within a search neighborhood scope of the candidate pixel 51, and thus no processing is performed on these pixels. That is, the pixels at the third part 53 are not subsequently determined whether their preset values are the same.

The preset value of each of the plurality of neighborhood pixels 52 is compared with the preset value of the candidate pixel 51 respectively. If among the plurality of neighborhood pixels 52 corresponding to the candidate pixel 51 there exist neighborhood pixels 52 whose preset values are equal to the preset value of the candidate pixel 51, these neighborhood pixels 52 are determined as similar pixels. The similar pixels of each of the candidate pixels 51 are clustered, but those neighborhood pixels 52 whose preset values are different from the preset value of the candidate pixel 51 are not clustered. After all the neighborhood pixels 52 of one candidate pixel 51 are determined, this candidate pixel 51 is moved to the location of a next pixel according to the first preset sequence, and so on. In this way, a plurality of first candidate curve segments corresponding to the first table are obtained. The plurality of first candidate curve segments are arranged along the first direction. That is, the plurality of first candidate curve segments are arranged along the row direction.

Figure 6:
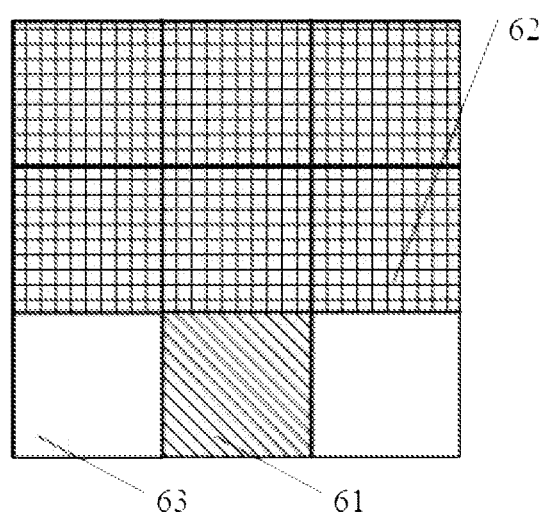
FIG. 6 illustrates a schematic diagram of a second mask pattern according to an embodiment of the present disclosure.

Correspondingly, neighborhood pixels of each candidate pixel in the binarized image are sequentially traversed column by column by utilizing a second mask pattern as shown in FIG. 6 according to a second preset sequence. The second preset sequence actually also is a sequence from bottom to top and from left to right. A first part 61 in the second mask pattern represents a candidate pixel selected in the process of traversing the binarized image. A second part 62 in the second mask pattern represents the neighborhood pixels of this candidate pixel 61. As shown in FIG. 6, one candidate pixel 61 corresponds to six neighborhood pixels 62. However, pixels corresponding to a third part 63 of the second mask pattern are not within a search neighborhood scope of this candidate pixel 61, and thus no processing is performed on these pixels. That is, the pixels at the third part 63 are not subsequently determined whether their preset values are the same.

The preset value of each of the plurality of neighborhood pixels 62 is compared with the preset value of the candidate pixel 61 respectively. If among the plurality of neighborhood pixels 62 corresponding to the candidate pixel 61 there exist neighborhood pixels 62 whose preset values are equal to the preset value of the candidate pixel 61, these neighborhood pixels 62 are determined as similar pixels. The similar pixels of each of the candidate pixels 61 are clustered, but those neighborhood pixels 62 whose preset values are different from the preset value of the candidate pixel 61 are not clustered. After all the neighborhood pixels 62 of one candidate pixel 61 are determined, this candidate pixel 61 is moved to the location of a next pixel according to the second preset sequence, and so on. In this way, a plurality of second candidate curve segments corresponding to the first table are obtained. The plurality of second candidate curve segments are arranged along the second direction. That is, the plurality of second candidate curve segments are arranged along the column direction, wherein the first direction is perpendicular to the second direction.

It is be noted that if the preset value of each candidate pixel (for example, the candidate pixel 51 or the candidate pixel 61) is 1, when the neighborhood pixels of each candidate pixel in the binarized image are traversed, only those foreground pixels whose preset values are 1 are regarded as the candidate pixels, and background pixels whose preset values are 0) are directly skipped and not processed. That is, it is not determined whether among the neighborhood pixels of the background pixels whose preset values are 0) there exist similar pixels whose preset values are equal to the sets values of the background pixels.

Step 304: processing the candidate curve segment to generate the second table corresponding to the first table.

In some embodiments of the present disclosure, after the candidate curve segment corresponding to the first table is obtained, the candidate curve segment is processed to generate the second table corresponding to the first table. The candidate curve segment includes a first candidate curve segment arranged in the first direction and a second candidate curve segment arranged in the second direction. The first candidate curve segment and the second candidate curve segment are processed separately to generate a first table line and a second table line. Next, the second table is generated based on the first table line and the second table line.

When the second table is obtained, table information corresponding to the second table may be obtained. The table information includes the number of the second tables, the number of rows and columns of each of the second tables, and first location information of each cell included in each of the second tables. The first location information of each cell may be represented by first location coordinates (u1, v1, u2, v2), wherein (u1, v1) represents the coordinates at the upper left corner of the cell, and (u2, v2) represents the coordinates at the lower right corner of the cell.

As shown in FIG. 4, the Step 304 may specifically include sub-step 3041 to sub-step 3043.

Sub-step 3041: fitting each of the first candidate curve segments and each of the second candidate curve segments respectively to obtain a first polyline segment and a second polyline segment.

Sub-step 3042: merging a plurality of first polyline segments and a plurality of second polyline segments respectively according to a first preset condition to obtain a first table line and a second table line.

Sub-step 3043: generating the second table corresponding to the first table according to the first table line and the second table line.

In a specific embodiment of the present disclosure, the candidate curve segments in the first table drawn manually by the user generally are curves. In this case, after a plurality of first candidate curve segments and a plurality of second candidate curve segments are obtained, first, each of the plurality of first candidate curve segment is fitted to obtain the first polyline segment fitted, and it is ensured that a distance from each point in the first candidate curve segment to the first polyline segment is less than a preset threshold, such that the first polyline segment fitted is more in line with requirements. Correspondingly, each of the plurality of second candidate curve segment is fitted to obtain the second polyline segment fitted, and it is ensured that the distance from each point in the second candidate curve segment to the second polyline segment is less than a preset threshold, such that the second polyline segment fitted is also in line with the requirements. The first polyline segment and the second polyline segment are both polyline segments composed of a plurality of interconnected straight line segments, and the preset threshold is set according to actual situations.

Next, when the user manually draws the first table, candidate curve segments belonging to the same table line may likely be drawn as two disconnected curve segments. Therefore, after the first polyline segment and the second polyline segment are obtained by fitting, a plurality of first polyline segments are merged according to the first preset condition, i.e., the first polyline segments likely belonging to the same table line are merged, to obtain the first table line. Furthermore, a plurality of second polyline segments are merged according to the first preset condition, i.e., the second polyline segments likely belonging to the same table line are merged, to obtain the second table line.

Finally, after the first table line and the second table line are obtained, the second table corresponding to the first table is generated according to the first table line and the second table line. The first table line is a table line arranged in the row direction, and the second table line is a table line arranged in the column direction.

In an alternative embodiment of the present disclosure, before the sub-step 3041, the method further includes: deleting the first candidate curve segment and the second candidate curve segment whose length is less than a first preset length.

In an actual application process, after the plurality of first candidate curve segments and the plurality of second candidate curve segments are obtained, a length of each of the plurality of first candidate curve segments and a length of each of the plurality of second candidate curve segments may be obtained, and the first candidate curve segments and the second candidate curve segments whose lengths are less than the first preset length are deleted. That is, those too short curve segments are deleted, which does not affect the shape of the second table generated subsequently, and can reduce the number of candidate curve segments when fitting the candidate curve segments subsequently. In this way, the operation process is simplified.

In an alternative embodiment of the present disclosure, the sub-step 3042 may include Step A1 and Step A2.

Step A1: for any two of the first polyline segments, if an endpoint of a first straight line segment in a first candidate polyline segment is within a first preset range where an endpoint of a second straight line segment in a first polyline segment to be merged is located, merging the first candidate polyline segment and the first polyline segment to be merged.

Step A2: for any two of the second polyline segments, if an endpoint of a first straight line segment in a second candidate polyline segment is within a first preset range where an endpoint of a second straight line segment in a second polyline segment to be merged is located, merging the second candidate polyline segment and the second polyline segment to be merged.

Figure 7:
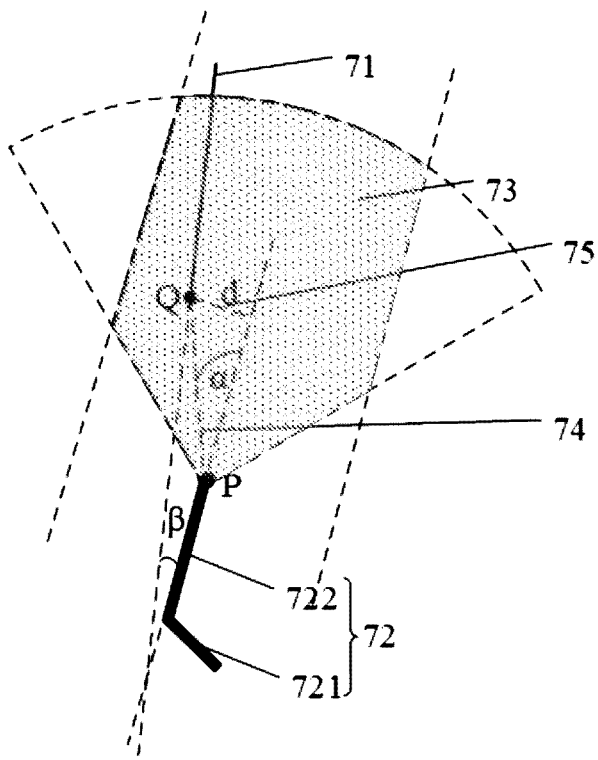
FIG. 7 illustrates a schematic diagram of a merging rule for merging a plurality of first polyline segments and a plurality of second polyline segments according to an embodiment of the present disclosure.

As shown in FIG. 7, Numeric 71 represents the first candidate polyline segment of the any two first polyline segments (only the first straight line segment in the first candidate polyline segment is shown), or the second candidate polyline segment of the any two second polyline segments (only the first straight line segment in the second candidate polyline segment is shown). Numeric 72 represents the first polyline segment to be merged of the any two first polyline segments or the second polyline segment to be merged of the any two second polyline segments.

Principles of merging the first candidate polyline segment and the first polyline segment to be merged are described as below by taking an example where the Numeric 71 represents the first candidate polyline segment of the any two first polyline segments and the Numeric 72 represents the first polyline segment to be merged of the any two first polyline segments.

The first candidate polyline segment 71 includes a first straight line segment, wherein the endpoint of the first straight line segment is Q. The first polyline segment to be merged 72 includes a first straight line segment 721 and a second straight line segment 722, wherein the endpoint of the second straight line segment 722 is P. If the endpoint Q of the first straight line segment in the first candidate polyline segment 71 is within the first preset range 73 where the endpoint P of the second straight line segment 722 in the first polyline segment to be merged 72 is located, it is determined that the first candidate polyline segment 71 and the first polyline segment to be merged 72 may likely belong to the same table line, and the first candidate polyline segment 71 and the first polyline segment to be merged 72 are merged.

Correspondingly, it may be determined in the above way for any two of the second polyline segments. If an endpoint of a first straight line segment in the second candidate polyline segment is within a first preset range where an endpoint of a second straight line segment in the second polyline segment to be merged is located, it is determined that the second candidate polyline segment and the second polyline segment to be merged may likely belong to the same table line, and the second candidate polyline segment and the second polyline segment to be merged are merged.

The first preset range 73 may be determined based on a first preset angle, a second preset angle, and a second preset length. When a first angle α is less than the first preset angle, a second angle β is less than the second preset angle, and a first length d is less than the second preset length, the endpoint Q of the first straight line segment is within the first preset range where the endpoint P of the second straight line segment 722 is located. The first preset angle, the second preset angle and the second preset length may be set according to actual situations.

Numeric 74 represents a first line segment formed between the endpoint Q of the first straight line segment and the endpoint P of the second straight line segment 722, Numeric 75 represents a perpendicular line segment formed from the endpoint Q of the first straight line segment to an extension line of the second straight line segment 722, the first angle α is an angle formed between the first line segment 74 and the extension line of the second straight line segment 722, the second angle β is an angle formed between an extension line of the first straight line segment and the extension line of the second straight line segment 722, and the first length d is a length of the perpendicular line segment 75 formed from the endpoint Q of the first straight line segment to the extension line of the second straight line segment 722.

In an alternative embodiment of the present disclosure, the sub-step 3043 may include Step B1, Step B2, Step B3, and Step B4.

Step B1: sorting a plurality of second table lines according to a third preset sequence.

Step B2: selecting, from the plurality of second table lines according to a sorting result, a second table line meeting a second preset condition as a first borderline, wherein the second preset condition includes: two first table lines existing within a second preset range where two endpoints of the second table line are located, and a length difference between the two first table lines being less than a third preset length.

Step B3: selecting, from the remaining second table lines, a second table line meeting a third preset condition as a second borderline, and determine the two first table lines as a third borderline and a fourth borderline respectively, wherein the third preset condition includes: the two endpoints of the second table line being respectively within a third preset range where first endpoints of the two first table lines are located.

Step B4: screening the remaining first table lines and the remaining second table lines according to the first borderline, the second borderline, the third borderline and the fourth borderline to obtain a table midline so as to generate the second table.

First, after the first table lines and the second table lines are obtained, the plurality of second table lines are sorted from left to right. That is, the third preset sequence is a sequence from left to right. Specifically, ordinates of the plurality of second table lines may be obtained, and these ordinates are sorted from smallest to largest, such that the plurality of second table lines can be sorted from left to right.

After the plurality of second table lines are sorted from left to right, it is determined in sequence, starting from the far left, whether each of the plurality of second table lines satisfies the second preset condition. If two first table lines X1 and X2 exist within the second preset range where two endpoints of the second table line Y1 are located, and the length difference between the two first table lines X1 and X2 is less than the third preset length, the second table line Y1 is determined as the first borderline, i.e., a left borderline. If the second table line does not meet the second preset condition, that is, if two first table lines do not exist within the second preset range where the two endpoints of the second table line are located, and/or the length difference between the two first table lines is not less than the third preset length, it is determined whether the next second table line meets the second preset condition according to a sorting result. The second preset range and the third preset length may be set according to the actual situations.

After the first borderline Y1 is determined, it is determined in sequence, from the remaining second table lines, whether the two endpoints of each second table line are within the third preset range where first endpoints of the two first table lines X1 and X2 are located, wherein the first endpoints are right endpoints of the two first table lines X1 and X2. If the two endpoints of the second table line are within the third preset range where the first endpoints of the two first table lines X1 and X2 are located, it is determined that the second table line meets the third preset condition, and the second table line is determined as the second borderline Y2. Furthermore, the two first table lines X1 and X2 are determined as the third borderline and the fourth borderline. That is, the second borderline Y2 is a right borderline, the third borderline X1 is an upper borderline, and the fourth borderline X2 is a lower borderline. In this way, the four borderlines (i.e., the upper borderline, the lower borderline, the left borderline, and the right borderline) of the second table are obtained, and the second borderline Y2 and the first borderline Y1 are not the same second table line. The third preset range may be set according to the actual situations.

Finally, the remaining first table lines and the remaining second table lines are screened according to the first borderline Y1, the second borderline Y2, the third borderline X1 and the fourth borderline X2 to obtain a table midline so as to generate the second table.

When the screen picture includes a plurality of first tables, the Steps B2 to B4 are performed to redetermine the left borderline, the right borderline, the upper borderline and the lower borderline for the remaining first table lines and the remaining second table line until there is no first table line or the second table line remained.

Specifically, the Step B4 may include Step B41 and Step B42.

Step B41: selecting, from the remaining first table lines, a first table line meeting a fourth preset condition as the table midline arranged along the first direction.

Step B42: selecting, from the remaining second table lines, a second table line meeting a fifth preset condition as the table midline arranged along the second direction.

The fourth preset condition includes: distances between the two endpoints of the first table line and the first borderline and the second borderline being less than a first preset distance. The fifth preset condition includes: distances between the two endpoints of the second table line and the third borderline and the fourth borderline being less than a second preset distance.

After the first borderline Y1, the second borderline Y2, the third borderline X1 and the fourth borderline X2 are determined, it is determined whether each of the remaining first table lines meets the fourth preset condition. That is, it is determined whether the distance between the two endpoints of each of the remaining first table lines and the first borderline Y1 and the second borderline Y2 is less than the first preset distance. If the determination result is Yes, the first table line is determined as the table midline arranged along the first direction. Correspondingly, it is determined whether each of the remaining second table line meets the fifth preset condition. That is, it is determined whether the distance between the two endpoints of each of the remaining second table lines and the third borderline X1 and the fourth borderline X2 is less than the second preset distance. If the determination result is Yes, the second table line is determined as the table midline arranged along the second direction. The first preset distance and the second preset distance may be equal or may be not equal, and the first preset distance and the second preset distance may be set according to actual situations.

Step 305: obtaining text information in the screen picture.

In some embodiments of the present disclosure, after the screen picture is obtained, the text information in the screen picture is recognized by using a text information recognition model.

Step 306: obtaining first location information of each cell in the second table.

In some embodiments of the present disclosure, after the second table is obtained, table information corresponding to the second table may also be obtained. The table information includes the number of the second tables, the number of rows and columns of each of the second tables, and first location information of each cell included in each of the second tables. The first location information of each cell included in each of the second tables is obtained.

Step 307: obtaining second location information of each of the text information.

In some embodiments of the present disclosure, when recognizing each text information, second location information of the each text information may be obtained correspondingly, wherein the second location information may be represented by coordinates (a1, b1).

Step 308: establishing a matching relationship between the second table and the text information according to the first location information and the second location information.

In some embodiments of the present disclosure, the first location information of each cell in the second table is matched with the second location information of the text information. The first location information of the cell may be represented by first location coordinates (u1, v1, u2, v2), wherein (u1, v1) represents the coordinates at the upper left corner of the cell, and (u2, v2) represents the coordinates at the lower right corner of the cell. The second location information of the text information may be represented by coordinates (a1, b1). If the abscissa a1 of the text information is between u1 and u2, and the ordinate b1 of the text information is between v1 and v2, it is determined that the text information is within the cell, and then the matching relationship between the cell in the second table and the text information is established.

Step 309: saving the second table containing the text into a destination document.

This step specifically includes: saving the second table, the text information and the matching relationship to obtain the destination document.

This step is similar in principle to the Step 106 in the forgoing embodiment, and thus is not unnecessarily elaborated herein.

In some embodiments of the present disclosure, when the user needs to save a screen content, the user may take a screenshot of the screen content by triggering an operation instruction indicating to take the screenshot of the screen content. Next, a candidate curve segment corresponding to the first table in the screen picture is automatically extracted, and a second table is obtained by processing the candidate curve segment. Next, text information in the screen picture is recognized, and a matching relationship between the second table and the text information is established according to the first location information of each call in the second table and the text information. Finally, the second table, the text information and the matching relationship are saved into a destination document, such that the user may edit the screen content again based on the destination document subsequently. In this way, the user's operation experience is improved.

Figure 8:
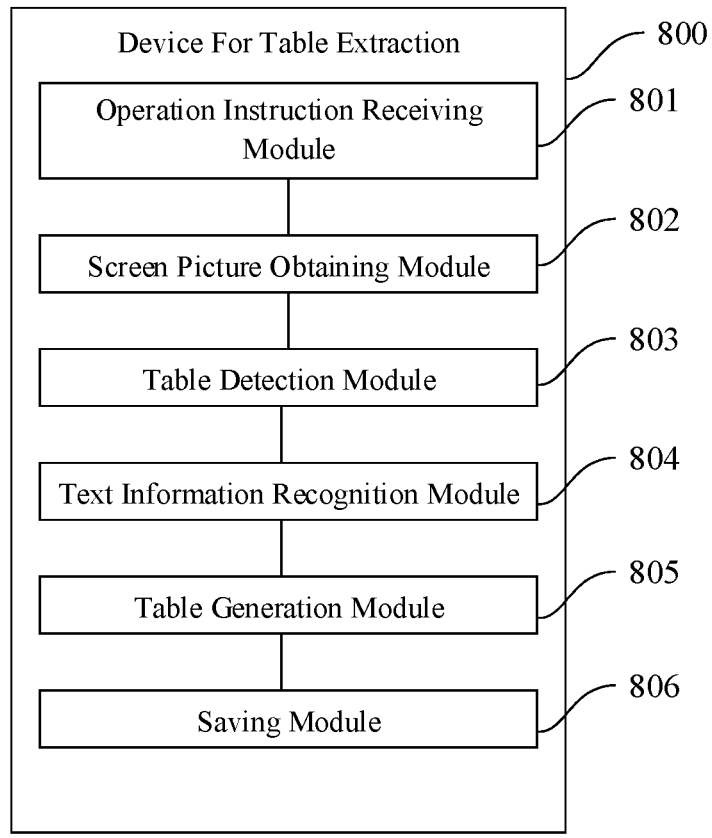
FIG. 8 illustrates a structural block diagram of a device for table extraction according to an embodiment of the present disclosure.

FIG. 8 illustrates a structural block diagram of a device for table extraction according to an embodiment of the present disclosure. As shown in FIG. 8, the device 800 for table extraction in this embodiment of the present disclosure may be applied to a touch control display device.

The device 800 for table extraction includes:
- a screen picture obtaining module 802, configured to extract a screen picture corresponding to a screen content of the touch control display device in response to an operation instruction, wherein the screen picture includes a first table;
- a table detection module 803, configured to detect the screen picture to obtain a second table corresponding to the first table;

a text information recognition module 804, configured to obtain text information in the screen picture; and a table generation module 805, configured to establish a matching relationship between the second table and the text information to obtain the second table containing a text.

Optionally, as shown in FIG. 8, the device 800 for table extraction may also include:

an operation instruction receiving module 801, confabulation receive an operation instruction, wherein the operation instruction is an operation instruction indicating to take a screenshot of the screen content of the touch control display device.

Optionally, as shown in FIG. 8, the device 800 for table extraction may also include:

a saving module 806, configured to save the second table, the text information and the matching relationship to obtain a destination document.

Optionally, the table detection module 803 includes:

a candidate curve segment recognition submodule, configured to recognize a candidate curve segment corresponding to the first table in the screen picture; and a second table generation submodule, configured to process the candidate curve segment to generate the second table corresponding to the first table.

Optionally, the candidate curve segment recognition submodule comprises:

a picture processing unit, configured to process the screen picture to obtain a binarized image;

a first traversing unit, configured to sequentially traverse neighborhood pixels of each candidate pixel in the binarized image row by row by utilizing a first mask pattern according to a first preset sequence;

a first candidate curve segment determining unit, configured to determine a neighborhood pixel equal to a preset value of the candidate pixel as a similar pixel to obtain a plurality of first candidate curve segments corresponding to the first table, the plurality of first candidate curve segments being arranged along a first direction;

a second traversing unit, configured to sequentially traverse neighborhood pixels of each candidate pixel in the binarized image column by column by utilizing a second mask pattern according to a second preset sequence; and a second candidate curve segment determining unit, configured to determine a neighborhood pixel equal to a preset value of the candidate pixel as a similar pixel to obtain a plurality of second candidate curve segments corresponding to the first table, wherein the plurality of second candidate curve segments are arranged along a second direction, and the first direction is vertical to the second direction.

Optionally, the second table generation submodule includes:

a candidate curve segment fitting unit, configured to fit each of the first candidate curve segments and each of the second candidate curve segments respectively to obtain a first polyline segment and a second polyline segment;

a polyline segment merging unit, configured to merge a plurality of first polyline segments and a plurality of second polyline segments respectively according to a first preset condition to obtain a first table line and a second table line; and a second table generation unit, configured to generate the second table corresponding to the first table according to the first table line and the second table line.

Optionally, the device 800 for table extraction also includes:

a candidate curve segment deleting unit, configured to delete the first candidate curve segment and the second candidate curve segment whose lengths are less than a first preset length.

Optionally, the polyline segment merging unit includes:

a first merging subunit, configured to merge, for any two of the first polyline segments, if an endpoint of a first straight line segment in a first candidate polyline segment is within a first preset range where an endpoint of a second straight line segment in a first polyline segment to be merged is located, the first candidate polyline segment and the first polyline segment to be merged; and a second merging subunit, configured to merge, for any two of the second polyline segments, if an endpoint of a first straight line segment in a second candidate polyline segment is within a first preset range where an endpoint of a second straight line segment in a second polyline segment to be merged is located, the second candidate polyline segment and the second polyline segment to be merged.

The first preset range is determined based on a first preset angle, a second preset angle, and a second preset length. When a first angle is less than the first preset angle, a second angle is less than the second preset angle, and a first length is less than the second preset length, the endpoint of the first straight line segment is within the first preset range where the endpoint of the second straight line segment is located.

A first line segment is formed between the endpoint of the first straight line segment and the endpoint of the second straight line segment. The first angle is an angle formed between the first line segment and an extension line of the second straight line segment. The second angle is an angle formed between an extension line of the first straight line segment and the extension line of the second straight line segment. The first length is a length of a perpendicular line segment formed from the endpoint of the first straight line segment to the extension line of the second straight line segment.

Optionally; the second table generation unit includes:

a second table line sorting subunit, configured to sort a plurality of second table lines according to a third preset sequence;

a first borderline determining subunit, configured to select, from the plurality of second table lines according to a sorting result, a second table line meeting a second preset condition as a first borderline, wherein the second preset condition includes: two first table lines existing within a second preset range where two endpoints of the second table line are located, and a length difference between the two first table lines being less than a third preset length;

a second borderline determining subunit, configured to select, from the remaining second table lines, a second table line meeting a third preset condition as a second borderline, and determine the two first table lines as a third borderline and a fourth borderline respectively, wherein the third preset condition includes: the two endpoints of the second table line being respectively within a third preset range where first endpoints of the two first table lines are located; and a second table generation subunit, configured to screen the remaining first table lines and the remaining second table lines according to the first borderline, the second borderline, the third borderline and the fourth borderline to obtain a table midline so as to generate the second table.

Optionally, the second table generation subunit is specifically configured to:

select, from the remaining first table lines, a first table line meeting a fourth preset condition as the table midline arranged along the first direction; and select, from the remaining second table lines, a second table line meeting a fifth preset condition as the table midline arranged along the second direction.

The fourth preset condition includes: distances between the two endpoints of the first table line and the first borderline and the second borderline being less than a first preset distance. The fifth preset condition includes: distances between the two endpoints of the second table line and the third borderline and the fourth borderline being less than a second preset distance.

Optionally; the text information recognition module 804 includes:

a first location information obtaining submodule, configured to obtain first location information of each cell in the second table;

a second location information obtaining submodule, configured to obtain second location information of each of the text information; and a matching relationship establishing submodule, configured to establish the matching relationship between the second table and the text information according to the first location information and the second location information.

Optionally, the device 800 for table extraction also includes:

a first title generation module, configured to generate a document title according to saving time of the destination document: or a second title generation module, configured to receive a document title inputted by a user, and add the document title to the destination document.

In this embodiment of the present disclosure, when a user needs to save a screen content, the user may take a screenshot of the screen content by triggering an operation instruction indicating to take the screenshot of the screen content. Next, the second table corresponding to the first table in the screen picture and text information in the second table may be automatically extracted, and the second table and the text information are saved as the destination document, such that user may edit the screen content again based on the destination document subsequently.

Device embodiments are basically similar to method embodiments, so description of the device embodiments is relatively simple, and the method embodiments can serve as reference.

Correspondingly, an embodiment of the present disclosure also provides a touch control display device, which includes a processor, a memory, and a computer program stored in the memory and executed by the processor. The computer program is executable by the processor, whereby procedures of the foregoing method for table extraction can be performed, and equivalent technical effects can be achieved. To avoid repetitions, detailed descriptions are omitted herein.

An embodiment of the present disclosure also discloses a non-transitory computer-readable storage medium, storing a computer program thereon. The computer program is executable by a processor, whereby procedures of the foregoing method for table extraction are performed, and equivalent technical effects can be achieved. To avoid repetitions, detailed descriptions are omitted herein. The forgoing computer-readable storage medium includes, for example, a read-only memory (ROM), a random access memory (RAM), a magnetic disk or an optical disk, etc.

The device embodiments set forth above are merely exemplary, wherein units described as detached parts may be or not be detachable physically: parts displayed as units may be or not be physical units, i.e., either located at the same place, or distributed on a plurality of network units. Modules may be selected in part or in whole according to actual needs to achieve objectives of the solution of this embodiment. Those of ordinary skill in the art may comprehend and implement the embodiment without contributing creative effort.

Each of devices according to the embodiments of the present disclosure can be implemented by hardware, or implemented by software modules operating on one or more processors, or implemented by the combination thereof. A person skilled in the art should understand that, in practice, a microprocessor or a digital signal processor (DSP) may be employed to realize some or all of the functions of some or all of the parts in the computing apparatus according to some embodiments of the present disclosure. The present disclosure may further be implemented as equipment or device program (for example, computer program and computer program product) for executing some or all of the methods as described herein. Such program for implementing the present disclosure may be stored in the computer readable medium, or have a form of one or more signals. Such a signal may be downloaded from the Internet websites, or be provided on a carrier signal, or provided in any other form.

Figure 9:
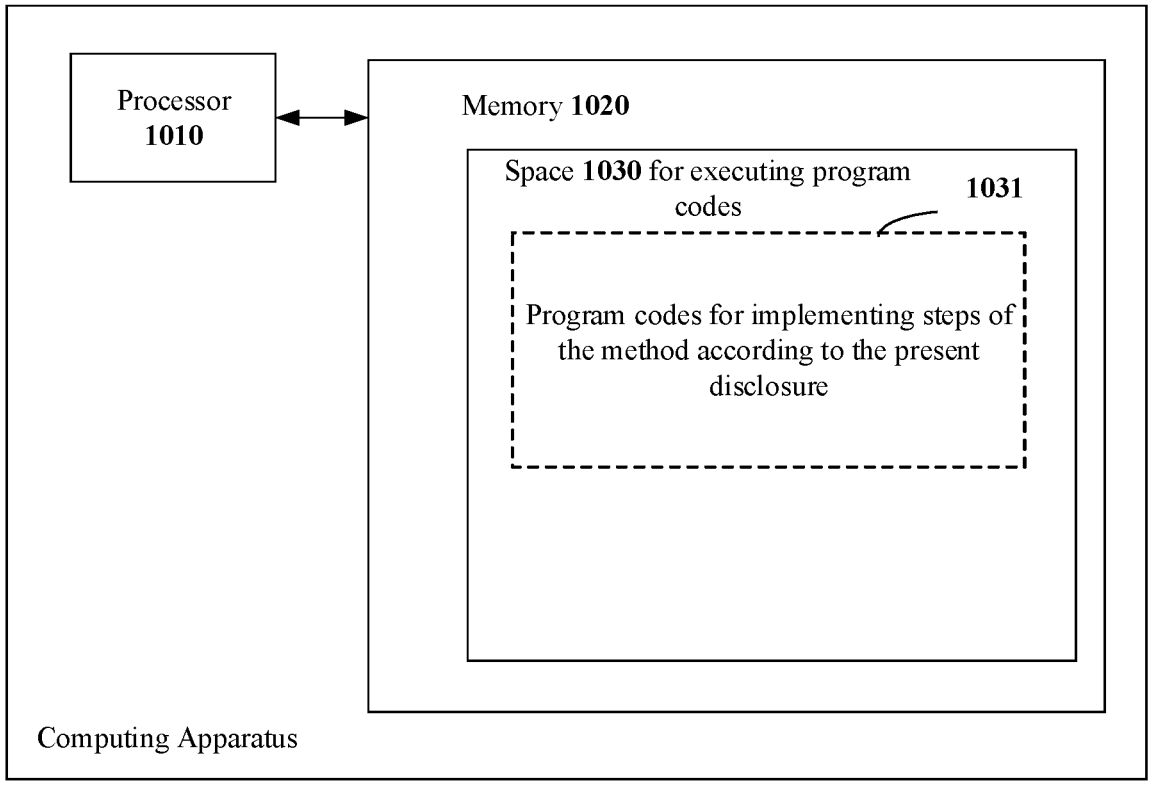
FIG. 9 schematically illustrates a block diagram of a computing apparatus for performing the method according to the present disclosure.
Figure 10:
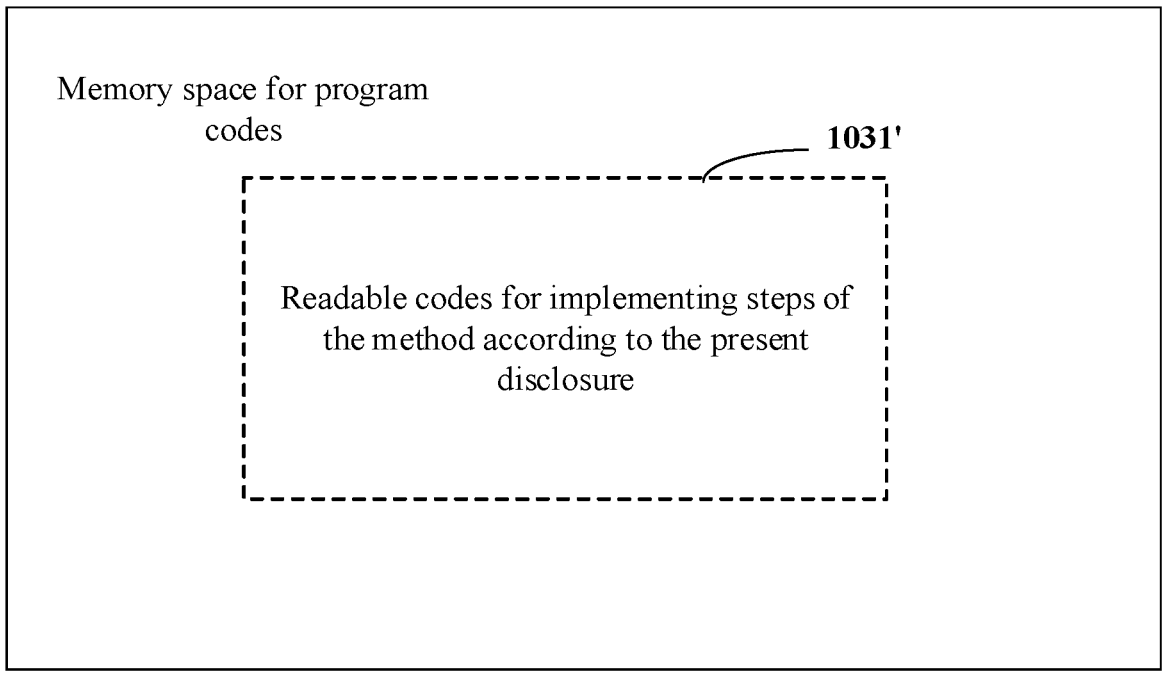
FIG. 10 schematically illustrates a memory cell for maintaining or carrying a program code for implementing the method according to the present disclosure.

For example, FIG. 9 illustrates a computing apparatus that may implement the method according to the present disclosure. Traditionally; the computing apparatus includes a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for executing program codes 1031 of any steps in the above methods. For example, the memory space 1030 for program codes may comprise respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are generally the portable or stable memory cells as shown in reference FIG. 10. The memory cells may be provided with memory sections, memory spaces, etc., similar to the memory 1020 of the computing apparatus as shown in FIG. 9. The program codes may be compressed for example in an appropriate form. Generally, the memory cell includes computer readable codes 1031' which can be read for example by processors 1010. When these codes are operated on the computing apparatus, the computing apparatus is caused to perform respective steps in the method as described above.

"One embodiment", "embodiments" or "one or more embodiments" herein means that particular features, structures or characteristics described in combination with the embodiments are included in at least one embodiment of the present disclosure. Furthermore, it is to be noted that the term "in one embodiment" herein does not necessarily refer to the same embodiment.

Many details are discussed in the specification provided herein. However, it should be understood that the embodiments of the present disclosure can be practiced without these specific details. In some examples, the well-known methods, structures and technologies are not shown in detail so as to avoid an unclear understanding of the description.

It should be explained that, for a brief description, the foregoing method embodiments are described as a combination of a series of motions. However, those skilled in the art should know that the present disclosure is not limited by sequences of the motions described. This is because some steps may be performed in other sequences or be performed simultaneously in accordance with the present disclosure. In addition, those skilled in the art should also learn that the embodiments described in the specification are preferred embodiments, and involved motions and modules are not necessary for the present disclosure.

The embodiments in the specification are described in a progressive manner. Each embodiment is focused on difference from other embodiments. And cross reference is available for identical or similar parts among different embodiments.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise or a device of these elements.

Detailed description of the method and device for table extraction, and a touch control display device provided by the present disclosure is made hereinabove, elaboration of the principle and implementation of the present disclosure is made by using specific examples herein, and the foregoing embodiments are merely intended to assist in understanding the method of the present disclosure and a core concept thereof. Also, those of ordinary skill in the art may change, in according with the core concept of the present disclosure, concrete implementations and scope of application. However, persons of ordinary skill in the art should understand that they may still make modifications to the technical solutions described in the foregoing embodiments or make equivalent replacements to some technical features thereof, which does not make corresponding technical solutions in essence depart from the spirit and the scope of the technical solutions of the embodiments of the present disclosure. In conclusion, contents of this specification shall not be interpreted as limiting the present disclosure.

The invention claimed is:

1. A method for table extraction, applied to a touch control display device, wherein the method comprising:

extracting a screen picture corresponding to a screen content of the touch control display device in response to an operation instruction, wherein the screen picture comprises a first table;

detecting the screen picture to obtain a second table corresponding to the first table;

obtaining text information in the screen picture; and establishing a matching relationship between the second table and the text information to obtain the second table containing a text;

the step of detecting the screen picture to obtain a second table corresponding to the first table comprises:

recognizing a candidate curve segment corresponding to the first table in the screen picture; and processing the candidate curve segment to generate the second table corresponding to the first table;

the step of recognizing a candidate curve segment corresponding to the first table in the screen picture comprises:

processing the screen picture to obtain a binarized image;

sequentially traversing neighborhood pixels of each candidate pixel in the binarized image row by row by utilizing a first mask pattern according to a first preset sequence;

determining a neighborhood pixel equal to a preset value of the candidate pixel as a similar pixel to obtain a plurality of first candidate curve segments corresponding to the first table, the plurality of first candidate curve segments being arranged along a first direction;

sequentially traversing neighborhood pixels of each candidate pixel in the binarized image column by column by utilizing a second mask pattern according to a second preset sequence; and determining a neighborhood pixel equal to a preset value of the candidate pixel as a similar pixel to obtain a plurality of second candidate curve segments corresponding to the first table, the plurality of second candidate curve segments being arranged along a second direction, wherein the first direction is not parallel to the second direction.

2. The method according to claim 1, wherein before the step of extracting a screen picture corresponding to a screen content of the touch control display device in response to an operation instruction, the method further comprises:

receiving the operation instruction;

wherein the operation instruction comprises:

an operation instruction indicating to take a screenshot of the screen content of the touch control display device; or an operation instruction indicating to perform table extraction on the screen picture corresponding to the screen content of the touch control display device.

3. The method according to claim 1, wherein the first table is a table drawn by utilizing a touch control operation of the touch control display device.

4. The method according to claim 1, wherein the first direction is perpendicular to the second direction.

5. The method according to claim 1, wherein the step of processing the candidate curve segment to generate the second table corresponding to the first table comprises:

fitting each of the first candidate curve segments and each of the second candidate curve segments respectively to obtain a first polyline segment and a second polyline segment;

merging a plurality of first polyline segments and a plurality of second polyline segments respectively according to a first preset condition to obtain a first table line and a second table line correspondingly; and generating the second table corresponding to the first table according to the first table line and the second table line.

6. The method according to claim 5, wherein before the step of fitting each of the first candidate curve segments and each of the second candidate curve segments respectively, the method further comprises:
deleting the first candidate curve segment and the second candidate curve segment whose lengths are less than a first preset length.

7. The method according to claim 5, wherein the step of merging a plurality of first polyline segments and a plurality of second polyline segments respectively according to a first preset condition to obtain a first table line and a second table line comprises:
for any two of the first polyline segments, if an endpoint of a first straight line segment in a first candidate polyline segment is within a first preset range where an endpoint of a second straight line segment in a first polyline segment to be merged is located, merging the first candidate polyline segment and the first polyline segment to be merged; and
for any two of the second polyline segments, if an endpoint of a first straight line segment in a second candidate polyline segment is within a first preset range where an endpoint of a second straight line segment in a second polyline segment to be merged is located, merging the second candidate polyline segment and the second polyline segment to be merged;
wherein the first preset range is determined based on a first preset angle, a second preset angle, and a second preset length; when a first angle is less than the first preset angle, a second angle is less than the second preset angle, and a first length is less than the second preset length, the endpoint of the first straight line segment is within the first preset range where the endpoint of the second straight line segment is located; and
wherein a first line segment is formed between the endpoint of the first straight line segment and the endpoint of the second straight line segment, the first angle is an angle formed between the first line segment and an extension line of the second straight line segment, the second angle is an angle formed between an extension line of the first straight line segment and the extension line of the second straight line segment, and the first length is a length of a perpendicular line segment formed from the endpoint of the first straight line segment to the extension line of the second straight line segment.

8. The method according to claim 5, wherein the step of generating the second table corresponding to the first table according to the first table line and the second table line comprises:
sorting a plurality of second table lines according to a third preset sequence;
selecting, from the plurality of second table lines according to a sorting result, a second table line meeting a second preset condition as a first borderline;
selecting, from the remaining second table lines, a second table line meeting a third preset condition as a second borderline, and determining the two first table lines as a third borderline and a fourth borderline respectively; and
screening the remaining first table lines and the remaining second table lines according to the first borderline, the second borderline, the third borderline and the fourth borderline to obtain a table midline to generate the second table.

9. The method according to claim 8, wherein the second preset condition comprises: two first table lines existing within a second preset range where two endpoints of the second table line are located, and a length difference between the two first table lines being less than a third preset length; and the third preset condition comprises: the two endpoints of the second table line being respectively within a third preset range where first endpoints of the two first table lines are located.

10. The method according to claim 9, wherein the step of screening the remaining first table lines and the remaining second table lines according to the first borderline, the second borderline, the third borderline and the fourth borderline to obtain a table midline comprises:
selecting, from the remaining first table lines, a first table line meeting a fourth preset condition as the table midline arranged along the first direction; and
selecting, from the remaining second table lines, a second table line meeting a fifth preset condition as the table midline arranged along the second direction.

11. The method according to claim 10, wherein the fourth preset condition comprises: distances between the two endpoints of the first table line and the first borderline and the second borderline being less than a first preset distance; and the fifth preset condition comprises: distances between the two endpoints of the second table line and the third borderline and the fourth borderline being less than a second preset distance.

12. The method according to claim 1, wherein the step of establishing a matching relationship between the second table and the text information comprises:
obtaining first location information of each cell in the second table;
obtaining second location information of each of the text information; and
establishing the matching relationship between the second table and the text information according to the first location information and the second location information.

13. The method according to claim 1, wherein after the step of establishing a matching relationship between the second table and the text information to obtain the second table containing a text, the method further comprises:
saving the second table containing the text into a destination document.

14. The method according to claim 13, wherein after the step of saving the second table containing the text into a destination document, the method further comprises:
generating a document title according to saving time of the destination document; or
receiving a document title inputted by a user, and adding the document title to the destination document.

15. A touch control display device, comprising a processor, a memory, and a computer program stored in the memory and executed by the processor, wherein the computer program is executable by the processor, whereby steps of the method for table extraction according to claim 1 are performed.

16. A non-transitory computer-readable storage medium, storing a computer program thereon, wherein the computer program is executable by a processor, whereby steps of the method for table extraction according to claim 1 are performed.

17. A computing apparatus, comprising:
a memory, storing a computer-readable code therein; and
one or more processors, wherein the computer-readable code is executable by the one or more processors, whereby the computing apparatus performs the method for table extraction according to claim 1.

* * * * *